(No Model.) 2 Sheets—Sheet 1.
H. D. AYRE.
DEVICE FOR MARKING OFF CORN ROWS.
No. 512,573. Patented Jan. 9, 1894.
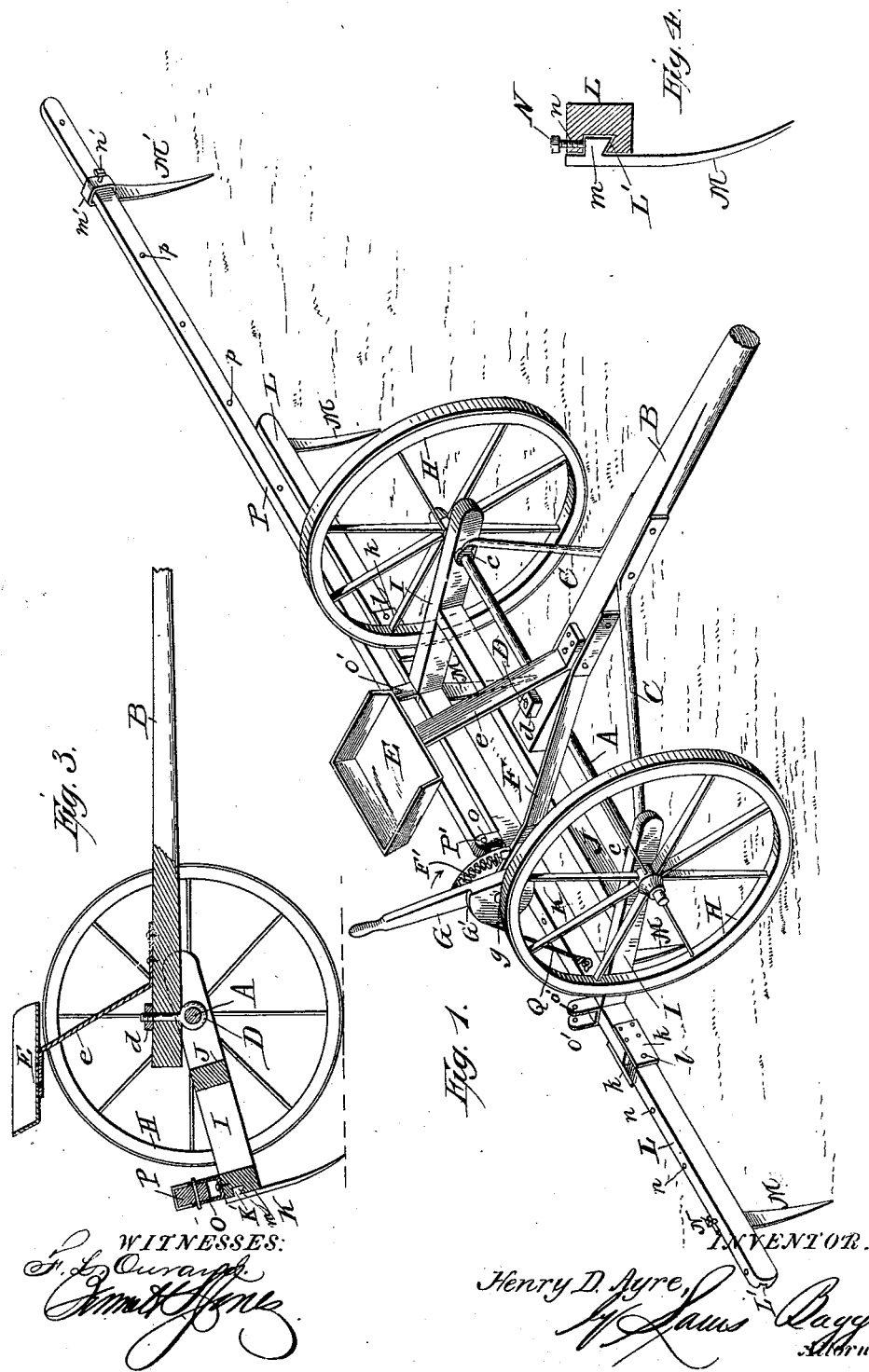
WITNESSES:
INVENTOR:
Henry D. Ayre,
Attorneys.
THE NATIONAL LITHOGRAPHING COMPANY,
WASHINGTON, D. C.

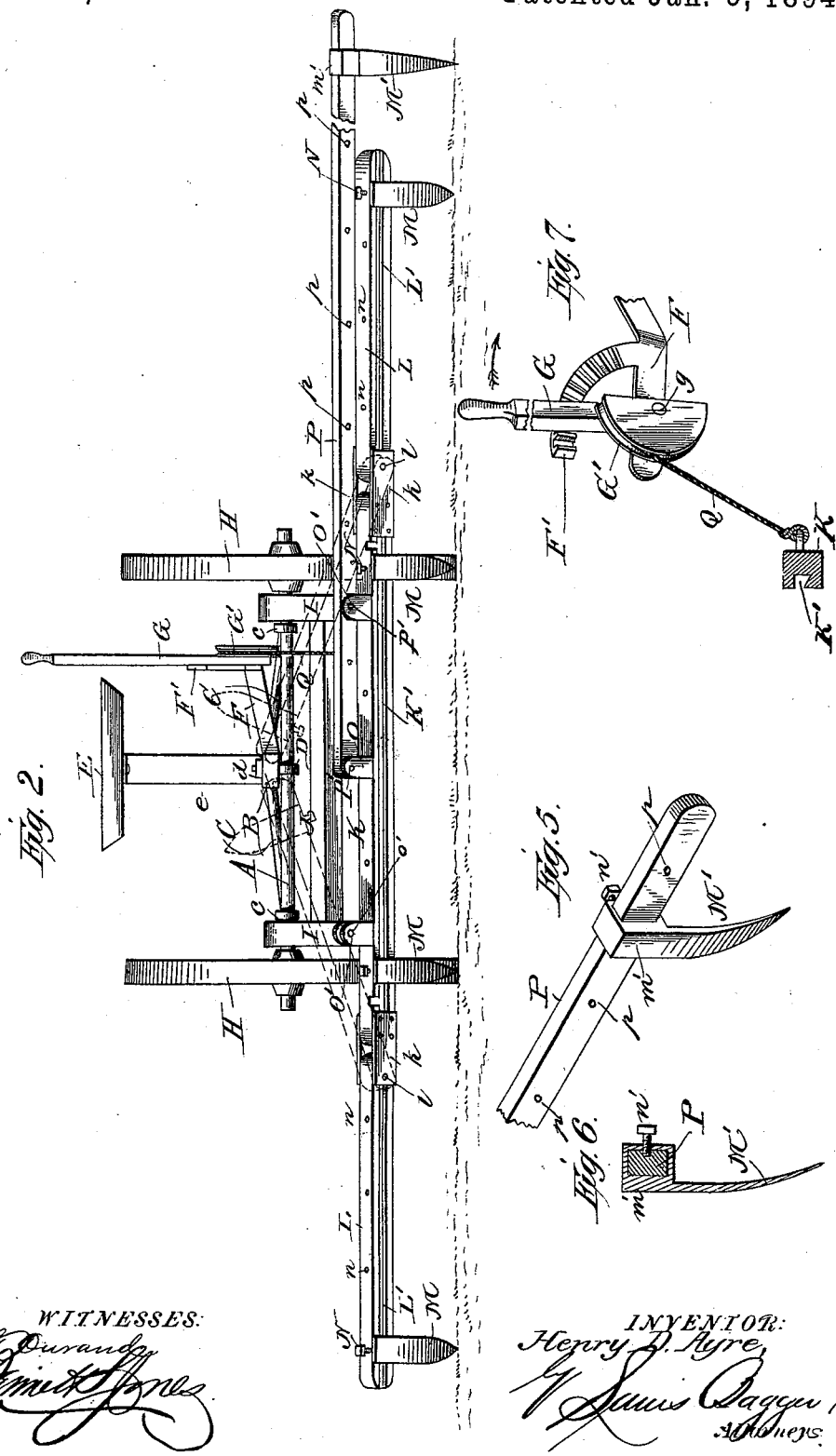

UNITED STATES PATENT OFFICE.

HENRY D. AYRE, OF KERFOOT, VIRGINIA.

DEVICE FOR MARKING OFF CORN-ROWS.

SPECIFICATION forming part of Letters Patent No. 512,573, dated January 9, 1894.

Application filed September 16, 1893. Serial No. 485,641. (No model.)

*To all whom it may concern:*

Be it known that I, HENRY D. AYRE, a citizen of the United States, and a resident of Kerfoot, in the county of Fauquier and State of Virginia, have invented certain new and useful Improvements in Devices for Marking Off Corn-Rows; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my machine for marking-off hills or rows in planting corn. Fig. 2 is a rear elevation of the same. Fig. 3 is a longitudinal sectional view on a vertical plane through the middle of the machine. Fig. 4 is a cross section through one of the hinged arms, with one of the adjustable "markers." Fig. 5 is a detail view of the laterally adjustable marker-rod with one of its adjustable markers. Fig. 6 is a cross section of the same; and Fig. 7 is a detail view of the lever-mechanism for raising or lowering the frame which carries the "markers."

Like letters of reference designate corresponding parts in all the figures.

This invention relates to implements for marking or laying-off parallel rows in a field to be planted with corn, for the purpose of making the "hills" absolutely parallel and uniform, and it consists in the novel and specific construction and combination of parts of a machine of that type, and for that particular purpose, as will be hereinafter more fully described and particularly pointed out in the claim.

On the accompanying drawings, the letter A denotes the axle, B the shaft or pole, and C C the hounds or braces of the latter, whereby it is firmly secured to the axle.

On reference to Fig. 3, it will be observed that the rear end of the shaft, overlapping the middle part of the axle, has an eyebolt D, fastened by a nut $d$, through the eye of which said bolt the axle is inserted, so that the shaft has a free up-and-down motion on axle A. To admit of such motion, the diverging ends of the hounds or side-braces C C terminate in eyes $c\ c$, in alignment with the central eyebolt D, through which the axle passes.

Upon the rear end of the shaft B is fastened, by a spring-bearing or bracket $e$, the driver's seat E; and fastened on one side of the shaft, near its rear end, is a rearwardly projecting arm F, to the outer end of which the lever G is pivoted, in such a manner that its upper end will be within easy reach of the person occupying the driver's seat.

Upon the axle A, between the wheels H H, is hung, movably, a frame which consists of the parallel side pieces I I, cross bar J, and the parallel end-bar K, the ends of which project beyond the sides I I. The outer ends of this bar K form bearings for the pivoted marker-arms L L, of which there are two, one on each side, pivoted (each) upon a bolt $l$, which is inserted transversely through parallel bearing-plates $k\ k$ projecting from the ends of bar K. These ends are rounded off, as are also the contiguous ends of the arms L L, in order to permit said arms to have free motion, up or down, at their hinges or points of attachment to bar K. The rear side of each arm L has a dovetailed groove or channel, L', running from end to and, in alignment (when said arms L L are extended, as illustrated in Fig. 2) with a similar longitudinal dovetailed groove K' on the rear side of bar K. These grooves L' and K' form the means of attachment for the adjustable and removable "markers" M, each of which is provided near its upper end with a dovetailed lug or projection $m$, adapted to fit the groove, into which it may be inserted endwise, and locked in its properly adjusted position by means of a binding-screw N, inserted into threaded apertures $n$ in the arms L L and bar K. These apertures are equidistant from one another, so that the position of the markers M may be regulated and adjusted, relative to one another, with absolute certainty before the machine is taken into the field and after the exact distance between the rows or "hills" has been predetermined.

Upon the middle of the central fixed bar K is fastened a bearing O, and near each of its ends is a similar bearing O', for the insertion of the auxiliary extensible or laterally adjustable marker-rod P. This rod is in the nature of a long arm and is connected to bearings O, O', on bar K, by means of removable pins P', inserted through transverse apertures $p$ in the rod, and registering apertures $o$, $o'$, in the bearings O and O'. By removing the pins P' and sliding the rod P in or out it can be laterally adjusted. After being properly adjusted the pins are again inserted in the registering apertures. The distance between the apertures $pp$ in rod P corresponds approximately to the distance between the threaded apertures $nn$ in the grooved bar K and its hinged arms L, L; and upon rod P is placed one or more markers M', of the same size and shape as the adjustable markers M upon bar K and its hinged arms L L; but with this difference, that instead of being made with a dovetailed fastening-lug or bearing $m$, each of these markers M' is provided with a rectangular sleeve $m'$, through which rod P is inserted, and which is provided with a binding-screw $n'$ inserted through one side, as illustrated more clearly in the detail view Fig. 6. By loosening these screws, the sleeve $m'$ may be slid forward and back upon the rod, and fastened securely upon the same in its properly adjusted position by means of its binding-screw $n'$.

The lever G, which is fulcrumed upon a bolt $g$ at the outer end of arm F, has a grooved segment, G', at its lower end, to which is attached a short rope or chain Q, which rests in the groove and has its lower end fastened to the end bar K, as illustrated more clearly in Fig. 7. It follows that by moving the lever in the direction of the arrow, viz., toward the driver's seat E, the lifting-rope or chain Q will be wound up upon the grooved segment G' and thereby raise bar K, and the arms L L, as well as rod P, which are fastened to it; thus lifting the markers M and M' high enough to clear the ground. In order to keep the lever in its adjusted position, arm F is provided with a notched segment F', and lever G has play enough upon its fulcrum laterally to permit of its being slipped into the notches of said segment, which will retain it and thus keep all the markers off or above the ground. By disengaging or releasing the lever from its notched segment, bar K, with its hinged arms L L and rod P, is instantly dropped down into its working position. The markers are only raised when going to or from the field, or in turning corners; and when going to the field where the machine is to be used, the hinged side-arms L L should be turned up out of the way, as shown in dotted lines in Fig. 2, while the long rod P is removed from bar K and carried upon or attached to the shaft B, with its end projecting from the rear end of the machine in alignment with the shaft.

From the foregoing description, taken in connection with the drawings, the operation of this machine will be readily understood without further explanation. The marker-shovels M and M' are adjusted respectively upon the bar K, arms L L and rod P, the proper distance apart, according to the space between the parallel rows or hills, after which the machine is pulled over the ground, from one end of the field to be laid out to the other. Four or more rows may thus be "marked" or laid off at one operation; the outside row marked off serving as a guide for marking off the rows on the next trip. In this manner, and by extending the marker-rod P to its full length, many parallel rows may be marked off at each trip, thus saving a great deal of time and labor.

Having thus described my invention, I claim and desire to secure by Letters Patent of the United States—

In a field "marker" of the described type, the combination of the axle A, hinged frame comprising the sides I I and parallel bars J and K, said bar K extending beyond the ends of the inner bar J and provided with a longitudinal dovetailed groove K'; hinged and longitudinally grooved arms L L; laterally adjustable rod P having equi-distant apertures $p$ and provided with the adjustable markers M'; markers M provided with dovetailed lugs $m$ adapted to engage the dovetailed grooves K' and L'; and binding-screws N; all constructed and combined substantially in the manner and for the purpose shown and set forth.

In testimony that I claim the foregoing as my own I have hereunto affixed my signature in presence of two witnesses.

HENRY D. AYRE.

Witnesses:
BENNETT S. JONES,
STEWART SHEA.